United States Patent
O'Neal (10) Patent No.: US 7,814,662 B2
(45) Date of Patent: Oct. 19, 2010

(54) CUTTING TOOL, METHOD OF MAKING THE SAME AND METHOD OF USING THE SAME

(76) Inventor: Michael O'Neal, 128 Nantucket Dr., Middletown, DE (US) 19709

(*) Notice: Subject to any disclaimer, the term of this patent is extended or adjusted under 35 U.S.C. 154(b) by 603 days.

(21) Appl. No.: 11/257,174

(22) Filed: Oct. 24, 2005

(65) Prior Publication Data
US 2007/0089579 A1 Apr. 26, 2007

(51) Int. Cl.
B21F 13/00 (2006.01)

(52) U.S. Cl. ............... 30/90.1; 30/90.4; 30/279.2; 30/280; 30/289; 30/294

(58) Field of Classification Search ......... 30/90.4–91.2, 30/90.1, 2, 294, 289, 280, 282, 279.2, 279.6, 30/287, 302; D8/98, 107
See application file for complete search history.

(56) References Cited

U.S. PATENT DOCUMENTS

| | | | | |
|---|---|---|---|---|
| 1,739,972 A | * | 12/1929 | Klinger | 30/90.4 |
| 2,120,398 A | * | 6/1938 | Edwards et al. | 30/90.6 |
| 2,776,480 A | * | 1/1957 | Abel | 30/124 |
| 3,238,618 A | * | 3/1966 | Cook, Jr. | 30/90.4 |
| 4,001,934 A | * | 1/1977 | Bell | 30/124 |
| 4,026,017 A | | 5/1977 | Arnold | |
| 4,070,930 A | | 1/1978 | Oprins | |
| 4,081,903 A | | 4/1978 | Cormier | |
| 4,117,749 A | | 10/1978 | Economu | |
| 4,335,512 A | * | 6/1982 | Sheps et al. | 30/376 |
| 4,536,957 A | * | 8/1985 | Britton | 30/90.4 |
| 4,543,717 A | | 10/1985 | Luka | |
| 4,799,406 A | | 1/1989 | Diaz-De-Guerenu-Aguirrebeitia | |
| 4,897,920 A | | 2/1990 | Dunbar | |
| 4,977,671 A | * | 12/1990 | Ducret | 30/90.2 |
| 5,093,992 A | * | 3/1992 | Temple et al. | 30/90.8 |
| 5,205,006 A | | 4/1993 | Panasuk | |
| RE34,358 E | * | 8/1993 | Miller | 30/296.1 |
| 5,577,150 A | * | 11/1996 | Holder et al. | 385/134 |
| 6,131,289 A | * | 10/2000 | Tarpill | 30/90.6 |

* cited by examiner

*Primary Examiner*—Boyer D Ashley
*Assistant Examiner*—Omar Flores-Sánchez
(74) *Attorney, Agent, or Firm*—Connolly Bove Lodge & Hutz LLP

(57) ABSTRACT

The present invention relates to a stripping tool with longitudinal and transverse blades that assist in stripping and removing sheathing from heavy gauge wire and cable. The cutting device comprises an elongated U-shaped structure with an angularly offset portion. A first blade or series of blades extend generally parallel to the longitudinal axis of the device to cut the sheath within the U-shaped structure longitudinally. A second blade or series of blades associated with the offset portion extend generally perpendicular to the longitudinal axis to cut the sheath transversely.

11 Claims, 5 Drawing Sheets

CUTTING TOOL, METHOD OF MAKING THE SAME AND METHOD OF USING THE SAME

BACKGROUND OF THE INVENTION

This invention generally relates to a cable or wire cutting device and, more particularly, to a device that is capable of cutting wire sheathing longitudinally and transversely along its circumference more safely and easily than is possible with current devices.

At present, tools are available that are capable of both cutting and stripping an outer sheath of a cable. The most basic tool for cutting and stripping a wire is a conventional utility knife. Such knives have sharp blades and can pose safety concerns.

A modified utility knife such as taught in U.S. Pat. No. 4,081,903 to Cormier may comprise a handle, a removable stripping blade, a cable guide and a cutting blade. The Cormier stripper is similar to a conventional retractable utility knife, but adds a guide that maintains the blade in an engaged position, so that the cable covering can be sliced longitudinally. However, the exposed and protruding blade places the user in danger of being cut.

U.S. Pat. No. 4,026,017 to Arnold discloses another type of stripping tool that uses conventional utility or razor blades. In Arnold, the cable stripping tool has two housing sections with substantially similar shape and size that form a cavity for receiving a conventional razor blade. The housing defines a recess to receive cable in a direction transverse to its length and a has a groove to receive the cable in a longitudinal direction. The cable to be stripped is placed within the recess and the tool is rotated about the cable to cut the sheathing around its circumference without cutting the underlying cable. In like manner, the cable can be pulled through the groove longitudinally so that the blade slices the sheathing in a longitudinal direction. Although the blade is somewhat recessed, the danger of a traditional utility knife is not eliminated because the blade is outwardly exposed within the recess. Furthermore, the tool requires dexterity on the part of the user to maintain engagement between the tool and the cable.

Other stripping tools employ a hinge-type or scissor-type mechanism. For example, U.S. Pat. No. 4,799,406 to Diaz-De-Guerenu-Aguirrebeitia discloses a hinge-type electrical wire stripping apparatus that includes a transverse blade and a longitudinal blade. The apparatus comprises a main body and an arm that can be (a) clamped around a sheathed wire to pierce the wire sheathing and then (b) rotated about the wire to cut the circumference of the sheathing. The apparatus then can be reoriented and reclamped to engage the longitudinal cutting blade and pulled along the length of the wire to cut the sheathing lengthwise and permit the separation of the sheathing from the wire. The clamping and reclamping requires a fair amount of dexterity and effort on the part of the user. Both hands must be used to engage and disengage the tool. Furthermore, the tool must be fully rotated about the wire to complete the circumferential cut. The clamping, reclamping, and full rotation required for this tool all increase the amount of time and effort required to strip the wire.

U.S. Pat. No. 4,117,749 to Economu teaches a hinge-type insulation stripper that has a first pair of jaws with blades extending substantially perpendicular to the axis of the tool, and a second pair of jaws with blades extending substantially parallel to the axis of the tool. First, the first pair of blades is pressed into and rotated about the cable to circumferentially cut the insulation circumferentially. Then, the second pair of blades is pressed into and pulled along the insulation to longitudinally cut the insulation. The tool has many moving parts, including pivoting parts and springs, which makes this tool more complicated and less rugged than non-hinged devices.

U.S. Pat. No. 4,070,930 to Oprins teaches an example of a scissor-type mechanism. The disclosed wire stripper tool comprises a pair of arms joined by a pivot pin. The upper arm comprises a cutting head that supports three blades adapted to slit the insulation around a wire. Two of the cutting blades are arranged parallel to the tool body to make two circumferential slits in the insulation by rotating the tool. The third blade is positioned perpendicular to the tool body to slice through the wire insulation in a longitudinal direction. Thus, the insulation can be peeled away or removed from the underlying wire core. Such scissor-type tools, however, are often bulky, heavy, and difficult to use. For example, the user clutches the tool at a distance from the wire or cable, thus reducing the user's leverage. Additionally, the tool has many moving parts, including pivoting parts and springs.

There have been other attempts to provide a tool that is capable of both cutting and removing the sheath from a portion of a cable. For example, U.S. Pat. No. 4,543,717 to Luka discloses a cable stripper that includes a transverse blade and longitudinal blade that is designed for use with an automated machine. A control mechanism urges continuous contact of the blade and blade holder against the cable surface as the blade holder encircles the cable to score the circumference of the cable jacket. A second blade and blade holder, similarly designed, are pulled in a longitudinal direction to score the cable jacket lengthwise. Thus, the cable jacket can be peeled away and removed. However, this tool is not optimal when stripping only a small amount of wire. Furthermore, the tool suffers from a lack of portability.

Thus, though wire strippers are known, they are typically bulky, difficult to use, complex, and/or unsafe. Industry still seeks a simple, safe, lightweight, and effective tool for stripping wire and cable. It would be an advantage to have a wire stripper tool that self-locks onto the cable to allow essentially one-handed manipulation of the tool. Moreover, it would be desirable to have a handheld tool that that is capable of cutting the cable or wire longitudinally using the blade on one portion of the tool, and cutting the circumference of a cable or wire sheath using a blade on a different portion of the tool, preferably offset from the first portion.

The following disclosure describes a novel tool that overcomes many of the deficiencies of conventional wire and cable stripping tools.

BRIEF SUMMARY OF THE INVENTION

The following disclosure and claims relate to wire stripping and, more particularly, to a handheld tool for removing the sheathing from a cable or wire sheath. The tool comprises a blade in one area of a generally U-shaped tool body for cutting a wire sheath in a transverse direction, and a blade in a different area of the tool body for cutting a wire sheath in a longitudinal direction. Single blades or blade pairs can be used for either transverse or longitudinal cutting. For example, transverse blades may be located on two sides of the generally U-shaped cutting tool, to cut around the circumference of the wire sheath in less time and with less effort than conventional tools.

Also disclosed and claimed is a tool with a blade in one area of a generally U-shaped tool for cutting one type of wire longitudinally and a blade in a different area of the tool body for cutting a different type of wire longitudinally.

Also disclosed and claimed is a method of inexpensively manufacturing a wire stripping tool. The tool's unique shape permits several variations of manufacturing a wire stripper using simple designs and conventional manufacturing techniques.

BRIEF DESCRIPTION OF THE DRAWINGS

Novel features and advantages of the present invention in addition to those noted above will be become apparent to persons of ordinary skill in the art from a reading of the following detailed description in conjunction with the accompanying drawings wherein similar reference characters refer to similar parts and in which.

DETAILED DESCRIPTION OF EMBODIMENTS OF THE INVENTION

The invention will now be described with reference to a first embodiment of the invention, which can be used for stripping wires or cables of virtually any size. For example, the embodiment may be used with heavy gauge wire, such as 1000 KCM, 800-750 MCM or 500 KCM wire.

Figure 1:
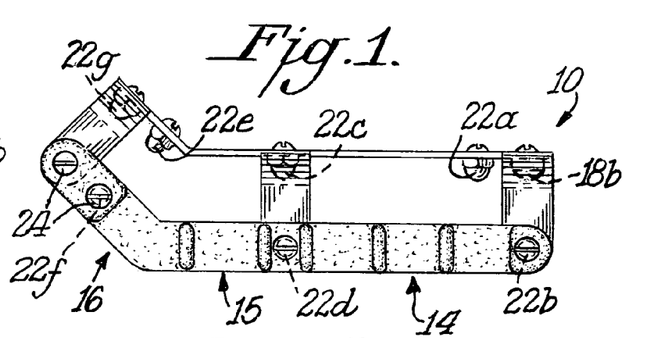
FIG. 1 is a side elevational view of a wire stripper of this invention.
Figure 2:
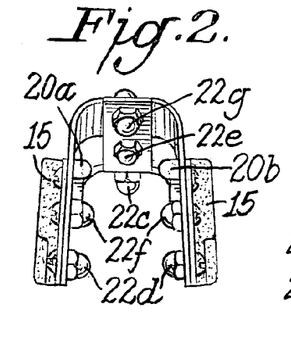
FIG. 2 is a front elevational view of the stripper of FIG. 1.
Figure 3:
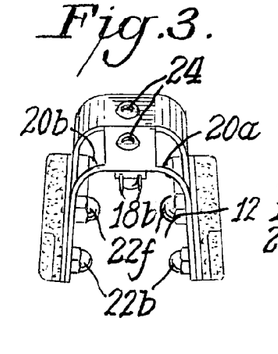
FIG. 3 is a rear elevational view of the stripper of FIG. 1.
Figure 4:
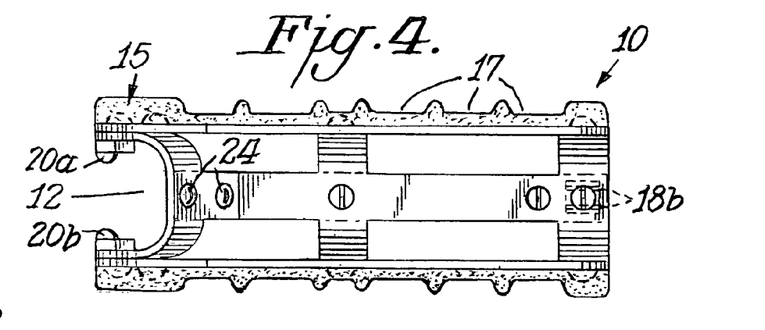
FIG. 4 is a top plan view of the stripper of FIG. 1.

According to the first embodiment, the tool may consist of a body 10 with a generally straight portion 14 and an offset portion 16, as may readily be seen in FIG. 1. Body 10 may comprise a generally U-shaped cross section, as shown in FIGS. 2 and 3, that forms an interior 12 sized to accept a wire or cable. Body 10 may also have a generally elongated shape when viewed from its top or side as shown in FIGS. 1 and 4. The interior 12 extends within straight portion 14 and offset portion 16. Offset portion may be aligned at an angle to straight portion 14 of, for example, 1 to 179 degrees.

The interior 12 may be provided with a series of blades 18 and 20 as shown in FIGS. 2 and 3. For example, FIG. 2 illustrates double blades 20a and 20b, which are aligned to cut a wire sheath in a transverse direction. FIG. 3 illustrates a blade pair 18b aligned with the longitudinal axis of the straight portion of the tool for longitudinally cutting a wire sheath.

Figure 5:
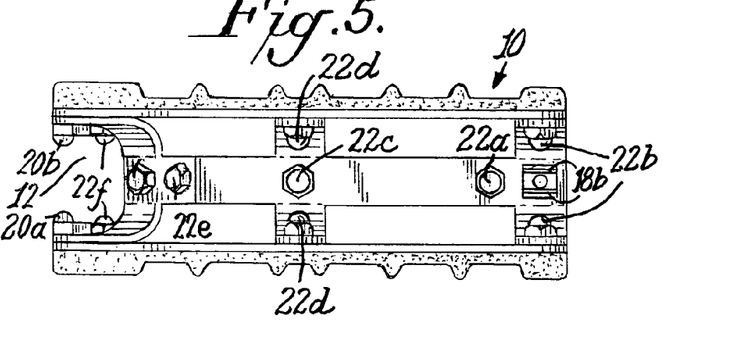
FIG. 5 is a bottom plan view of the stripper of FIG. 1.
Figures 9, 10, 11, 12, 13, 14, 15, 16:
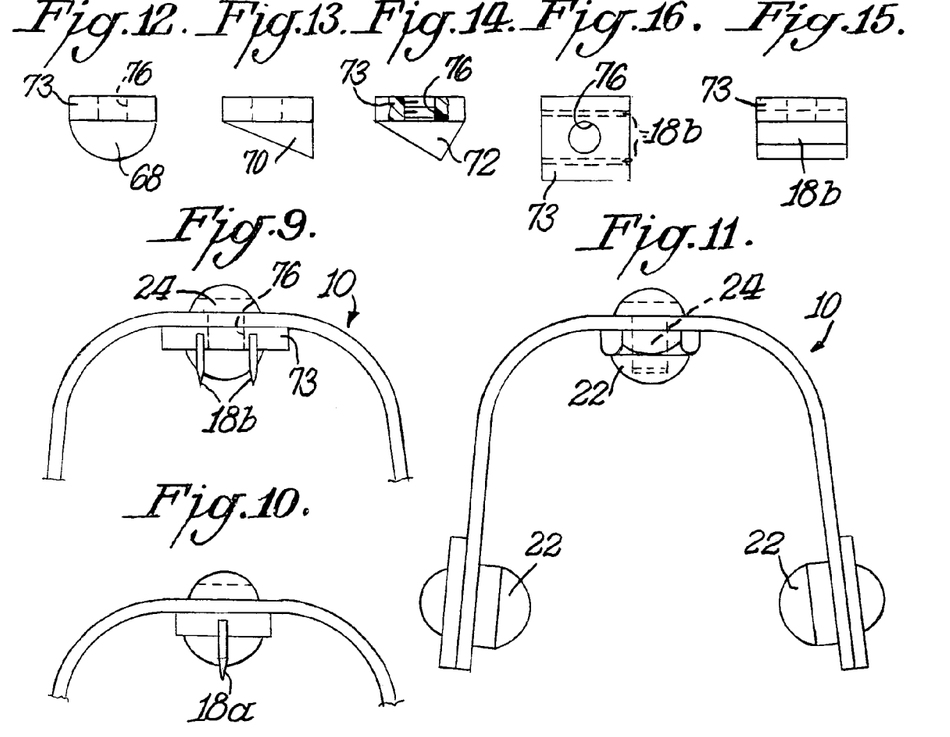
FIG. 9 is a fragmented rear view of a wire stripper of this invention showing the longitudinal cutter blades.
FIG. 10 is a fragmented rear view showing an alternate longitudinal cutter blade.
FIG. 11 is a fragmented front elevational view of a wire stripper of this invention showing the wire guides that engage the wire during longitudinal or circumferential cutting.
FIGS. 12-15 show cutter blades having different cutting profiles for use in the wire stripper.
FIG. 16 is a top plan view of the cutter blades shown in FIGS. 12-15.

Longitudinal blade configurations are more particularly shown in FIGS. 9 and 10. Like FIG. 3, FIG. 9 illustrates the use of multiple blades 18b, aligned parallel with the longitudinal axis of the length of that portion and transverse to the cross section of the tool body 10. FIG. 10 illustrates an alternative configuration with a single blade 18a. Blade 18a or blades 18b may be placed in one area of tool body 10, such as tool portion 14, shown in FIGS. 1, 4, and 5, and may be held in position with bolts 24 or by glue, weld, or other fastening means.

As shown in FIG. 2, blades 20a and 20b may be placed on opposing sides of an area of body 10. As further shown in FIGS. 4 and 5, blades 20a and 20b may be located in a different area of body 10 from where blades 18b are located, such as in offset portion 16. Blades 20a and 20b may be aligned perpendicularly to the longitudinal axis of the length of that portion of the tool body 10. As an alternative, or in addition to, blades 20a and 20b, a single blade (not shown) may be placed at the midpoint of the generally U-shaped portions of the tool and, like blades 20a and 20b, may be aligned perpendicular to the length of portion 16 of tool body 10. Blades 20a and 20b may be held in position with bolts 24 or by glue, weld, or other fastening means.

Blades 18a or 18b and 20a or 20b may be formed of any desired shape that will facilitate cutting the wire sheath 42. FIGS. 12-16 illustrate some exemplary blade configurations. For example, the blades may have a curved shape 68, right triangular shape 70, generally triangular shape 72, or a straight blade shape 18b. Although FIG. 12 shows an outwardly curved or convex surface, the surface may alternatively be curved inwardly to create a concave crescent or hook shape. As shown in FIGS. 14 and 16, the blades may be attached to base 73 that is provided with threaded hole 76 to receive bolts 24, as shown in FIGS. 9 and 10. Alternatively, the blades may be provided with threaded bolt ends, which may then be affixed to a nut on the exterior of the U-shaped cross-section. The blade, base, and/or bolt may comprise a metal, such as steel, or any other suitable material as is conventionally known in the art.

In addition to the blades 18b, 20a and 20b, tool body 10 may be provided with a series of wire guides 22a-g, in a complementary position to the blades that support, or guide, the wire 40 while tool 10 is in use. As shown in FIG. 11, wire guides 22 are held in place with bolts 24 or by glue, weld, or other fastening means. The wire guides 22, which will be described in greater detail below with respect to FIGS. 6 and 7, maintain the wire 40 within the opening 12. Wire guides 22a, 22c, 22e, 22f, and/or 22g, located along the midpoint of the generally U-shaped cross-section, may also serve as blade guides for establishing the appropriate blade penetration depth so that blades 18 and 20 penetrate the sheath 42, but do not penetrate the underlying wire core 44.

Tool 10 may be provided with a coating or layer 15, shown in FIGS. 1 through 5. Layer 15 may electrically insulate the tool, may make the tool 10 more comfortable to handle, and/or may provide an aesthetically pleasing cover for underlying tool body 10. Layer 15 may be formed by dipping, spraying, brushing or other suitable manner to deposit a rubber, polymer or other suitable coating onto tool body 10. Layer 15 may further be provided with indents or grips 17 to allow the user to comfortably and firmly grasp the tool body 10, and provide for better tool control during use. For example, the user's fingers may rest within indents 17 to prevent tool body 10 from slipping from the user's hand. Indents may be provided by molding, cutting or shaping layer 15 in any suitable manner. Layer 15 may be applied at any time during the formation of tool body 10.

Figures 6, 7:
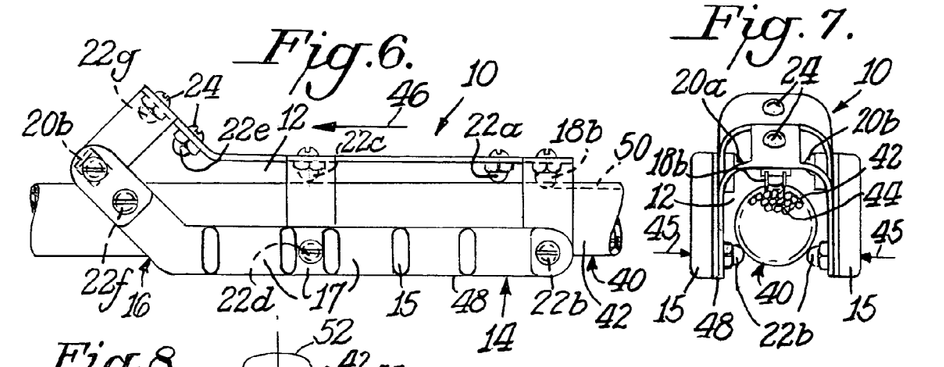
FIG. 6 is a side elevational view showing the stripper of the invention stripping a wire sheath along a longitudinal axis.
FIG. 7 is a front elevational view of the wire stripper and wire of FIG. 6.

The device will further be described with regard to one exemplary application. As shown in FIGS. 6 and 7, to cut the sheath 42 longitudinally from wire core 44, wire 40 is placed within area 12 of portion 14 and maintained in position by virtue of opposing pairs or wire guides 22b and 22d, which may be placed closer together than the diameter of wire 40. Thus, as the tool is placed onto and around wire 40, wire guides 22b and 22d on one interior side of tool body 10 are further separated from opposing wire guides 22b and 22d on the other interior side of tool body 10 for as long as the diameter of wire 40 passes between them. Wire guides 22b and 22d on opposing interior sides of tool body 10 may then return to a distance smaller than the diameter of wire 40 to maintain the engagement of tool body 10 with wire 40. Once engaged, blades 18b penetrate sheath 42. Wire guides 22a and 22c also serve as blade guides to control the depth of penetration of the blade. The tool may alternatively or further be engaged by the pressure of a user's hands or fingers, as shown by the arrows 45 in FIG. 7. The tool may then be pulled along the length of wire 40, illustrated by arrow 46 in FIG. 6 to form a longitudinal cut 50 equal to the length of wire 40 desired to be stripped. Of course, the tool could be pulled in the direction opposite that of arrow 46 without departing from the scope of the invention. Thus, wire guides 22a-22d maintain the proper engagement of blades 18b and proper alignment of the wire during the formation of the longitudinal cut 50. The tool body 10 can be engaged to penetrate the sheath 42 by the pressure of a user's hands or fingers because the tool body 10 has an open-cage construction with one or more windows or openings between the main body portion 56 or spine 59 and body side portions 58 and rib sections 63 (see FIGS. 1, 4, 5, 17 and 18) that give the tool greater flexibility. This greater flexibility further allows the same tool to be used to cut different diameter sizes of wires or cables. The open-cage construction additionally permits the user to better see that the wire sheath 42 is engaged by the cutting blades, thus increasing user safety when using the cutting device.

After the user has cut the desired length of the wire sheath 42, tool 10 may be disengaged from wire 40 by grasping the lower edge 48 of tool body 10 and pulling the tool 10 away from wire 40.

Figure 8:
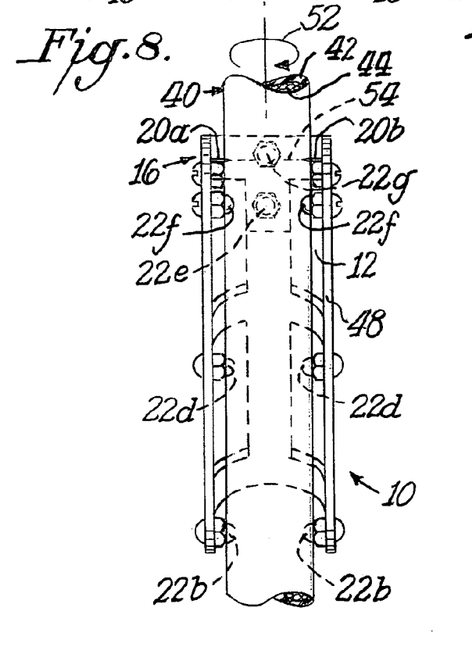
FIG. 8 is an elevational view showing the stripper of FIG. 7 cutting the sheath around the circumference of the wire.

As shown in FIG. 8, sheath 42 may be cut around the circumference of wire 40 by engaging the offset end 16 of tool 10 in a manner similar to that described with respect to FIGS. 6 and 8 above. Wire guides 22f, opposing each other within interior 12, may be placed closer together than the diameter of wire 40 and may move away from each other while the diameter of wire 40 passes between them. Under such conditions, after the diameter of wire 40 passes between wire guides 22f, the guides 22f may then return to a separation distance smaller than the diameter of wire 40 to engage tool body 10 with wire 40. Opposing wire guides 22d may also contact wire 40 to maintain proper orientation with respect to tool 10. Once engaged, blades 20a, or blade 20b, penetrate sheath 42. Wire guide 22e and/or 22f may serve as blade guides to control the depth of penetration of the blade. The tool may alternatively or further be engaged by the pressure of a user's hands or fingers (not shown). Once engaged, the tool may then be rotated around the circumference of wire 40, illustrated by arrow 52, forming circumferential cut 54. The tool may alternatively be rotated in the direction opposite that of arrow 52 without departing from the scope of the invention. The tool may be rotated by only 180° if blades 20a and 20b are placed on opposing sides of interior 12, as shown in FIG. 8, or by 360° if a single blade (not shown) is placed at the midpoint of the generally U-shaped tool body 10.

After the user has cut around the circumference of the wire sheath 42 with tool 10, tool 10 may be disengaged from wire 40 by grasping the lower edge 48 of tool body 10 and pulling the tool 10 away from wire 40. The circumferential cutting process described with respect to FIG. 8 may be performed at two or more locations on the wire so that the desired length of sheath 42 may be stripped from the wire core 44.

The manufacture of tool body 10 will now be described in greater detail. Tool body main portion 56, shown in FIG. 17, and tool body side portion 58, shown in FIG. 18, may be formed of metal, plastic, or any other suitable material. The material may be shaped by any technique, including stamping, molding, casting, laser cutting, extrusion or other suitable manufacturing method. Main body portion 56 and body side portion 58 may also be formed by shaping, or combining and connecting more basic individual components in any conventional manner to create the unique shape of tool body 10. For example, tool body 10 main body portion 56 may be any combination of individual straight or bent portions, which are then connected together by bolts, glue or other fastening means. As shown in FIGS. 1-5, bolts 24 may be connected to wire guides 22a-g to connect the individual parts of tool body 10. Holes 62 may be stamped, drilled, ablated with a laser or formed in any other suitable manner at any period during the formation of tool body 10 to permit bolts 24 to pass through the individual body portions, such as portions 56 and 58.

Figure 17:
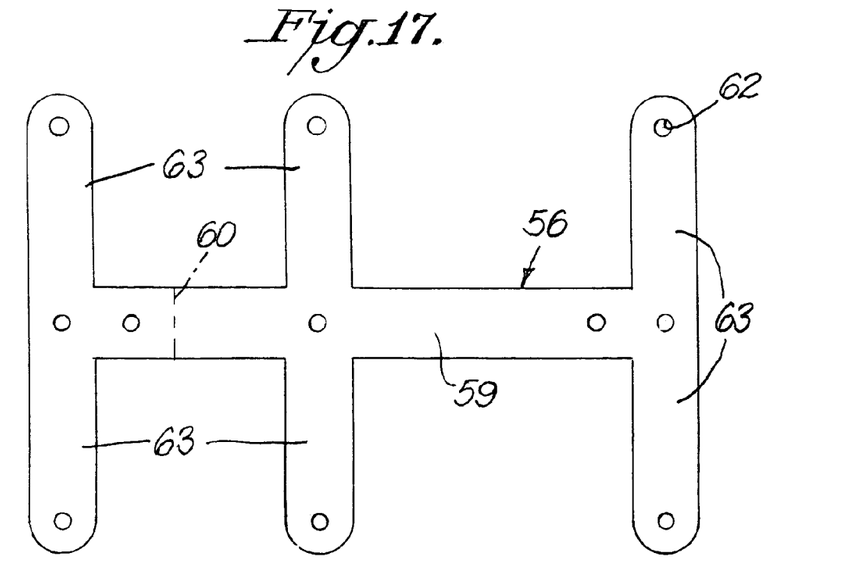
FIG. 17 is a top plan view profile of a frame structure prior to shaping the frame into its finished form for a coaxial stripper of the invention.
Figure 18:
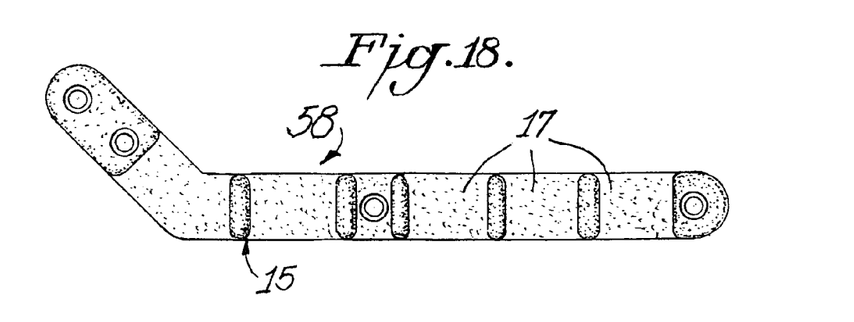
FIG. 18 shows the side rail shape of the frame structure for a coaxial stripper of the invention.

According to one example, shown in FIGS. 17 and 18, main body portion 56 may be offset along fold line 60 during the formation of main body portion 56 or may be bent into shape at any time thereafter. Main body portion 56 may have a spine portion 59 and multiple rib portions 63. As described above with reference to FIGS. 1-5, side portions 58 in FIG. 18 may be connected to main body portion 56 by bolts, glue or other fastening means. Main body portion 56 may be bent or formed a generally U-shape at any time during or after the body portions have been assembled and connected. Layer 15 may be provided prior or subsequent to connection of the individual portions. Although FIG. 17 illustrates middle rib section 63 and fold line 60 offset to one side, i.e. closer to one end of the tool than the other, it is understood that these features could be located anywhere along the tool, such as at the midpoint of spine portion 59.

Figure 20:
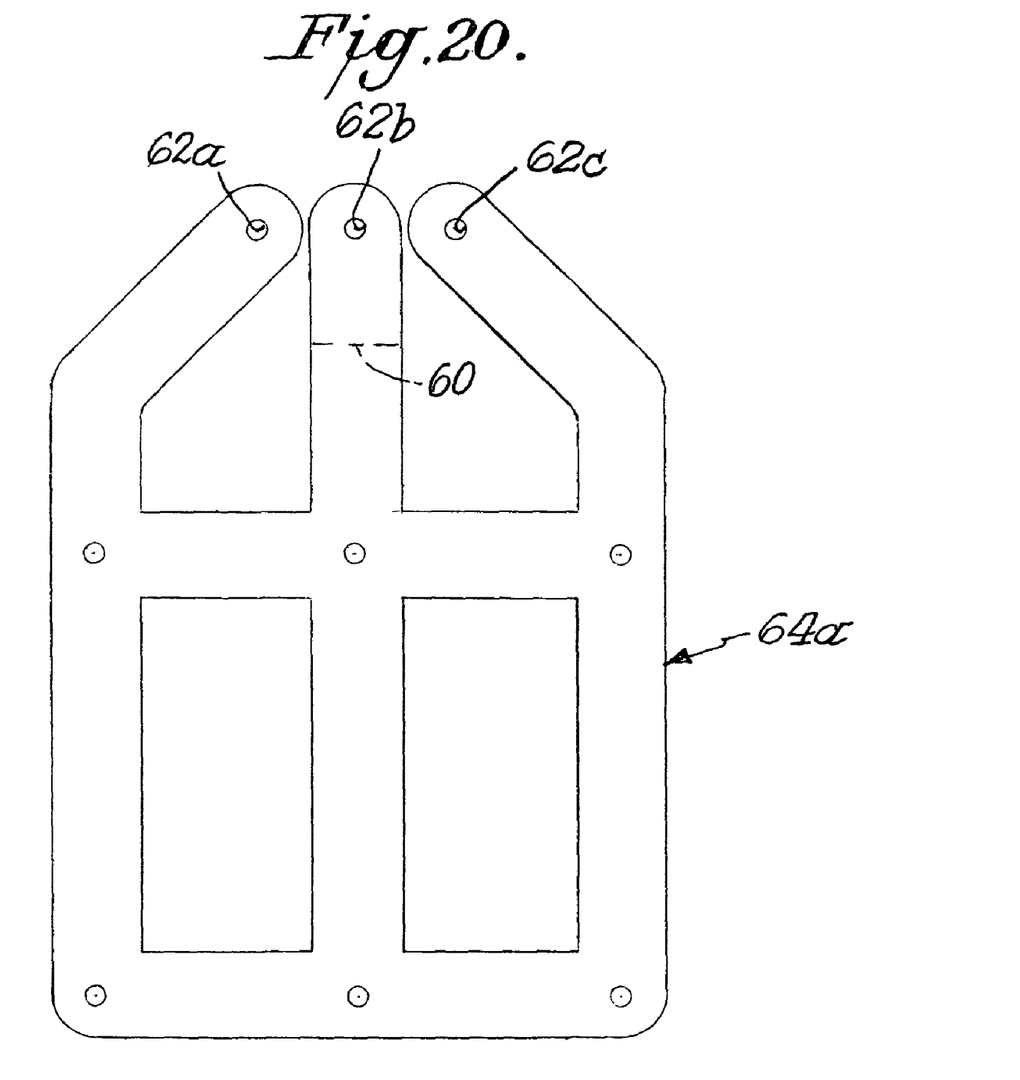
FIG. 20 is a top plan view profile of a frame structure of an alternate embodiment prior to shaping the frame into its finished form for a coaxial stripper of the invention.
Figure 21:
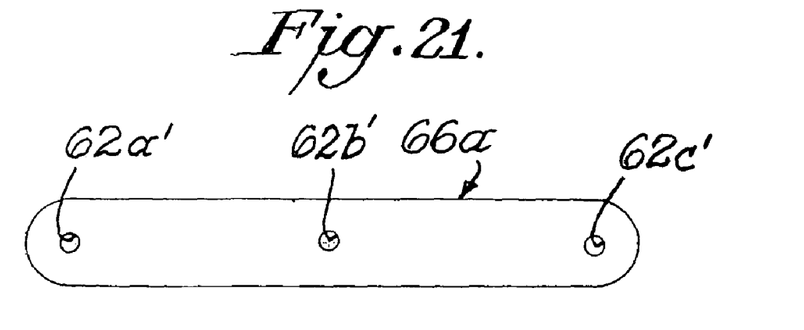
FIG. 21 is a top plan view profile of a rib for connecting to the frame structure of FIG. 20 to a form a coaxial stripper of the invention.
Figure 22:
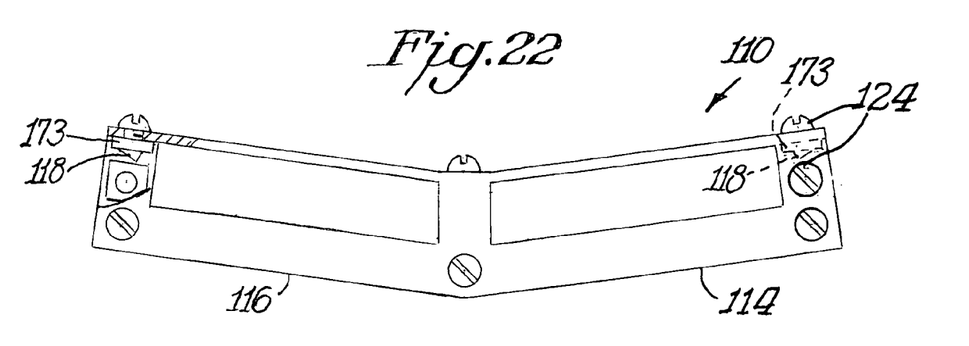
FIG. 22 is a right side elevational view of an alternative embodiment of the wire stripper of this invention with a portion cut-away to show the blades and wire guides.

Alternatively, tool body 10 may be formed of a main body portion 64a, shown in FIG. 20. Main body portion 64a may be bent into a desired U-shape and bent along line 60 to provide an offset. Main body portion may then be connected to rib portion 66a, by bending the straight rib portion 66a shown in FIG. 21 into a U-shape, aligning holes 62a, 62b, and 62c with holes 62a', 62b', and 62c', and connecting the two portions to form the complete tool body 10. Portions 64a and 66a may be connected by bolts 24, glue, weld or other fastening means, as described with respect to FIGS. 1-5. Portions 64a and 66a may formed in any conventional manner of any conventional material, as described above, and may be provided with layer 15 prior or subsequent to connection of the individual portions.

Figure 19:
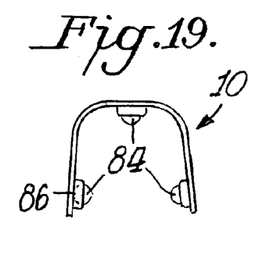
FIG. 19 illustrates a schematic end elevational view of an alternate embodiment of a coaxial stripper of the invention that utilizes ball bearings for wire guides.

The wire guides illustrated in FIGS. 1-3, for example, may comprise any shape or configuration and may comprise conventional cap nuts. However, according to an alternative embodiment shown in FIG. 19, wire guides may comprise ball bearings 84, roller bearings (not shown) or other friction reducing bearings. Ball bearings 84 may be connected to base 86 in any conventional manner including through a pin (not shown) that passes through the center of the bearing and into the sides of base 86. Ball bearings 84 may advantageously reduce friction between the tool body and wire.

Figure 23:
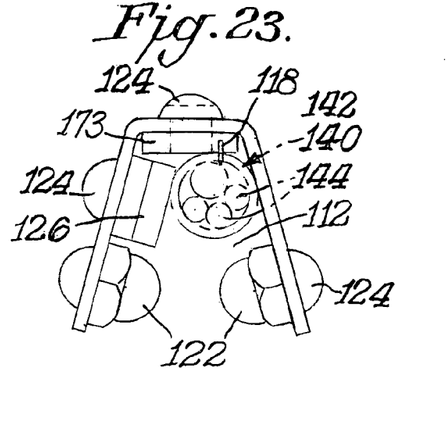
FIG. 23 is a front elevational view of the stripper of FIG. 22.

FIGS. 22 through 25 illustrate another embodiment of the invention. According to this embodiment, the tool may be used for smaller wire, such as 10, 12, or 14 gauge 2-way wire 140 and/or 3-way wire 140a, such as is typically sold under the trade name "Romex." For example, one side of the tool may be provided with a blade 118 located at or near the midpoint of the generally U-shaped cross section and may be generally aligned to be parallel with the longitudinal axis of tool portion 116 for cutting 2-way wire 140, as shown in FIG. 23.

Figure 24:
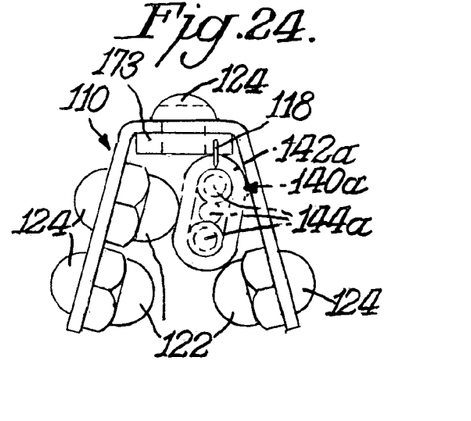
FIG. 24 is a rear elevational view of the stripper of FIG. 22.

Tool portion 114, shown more particularly in FIG. 24, may be similarly provided with a blade 118 located at or near the midpoint of the generally U-shaped cross section and aligned to be generally parallel with the longitudinal axis of tool portion 114 for cutting 3-way wire 140a. Blades may be connected in any suitable manner, such as that described above. For example, blade 118 may be connected to a base 173 which is provided with threads for receiving bolt 124. Tool portions 114 and 116 may be offset along the midpoint of tool 110 for added comfort.

Additional wire guides may be provided to align the wire with respect to the blades. For example, wire guides 122 and flattened wire guide 126 may be provided in region 116 for guiding and/or maintaining wire 140 during the cutting process, as shown in FIG. 23, and wire guides 122 may be provided in region 114 for guiding and/or maintaining wire 140a during the cutting process, as shown in FIG. 24. Additionally, though FIGS. 23 and 24 illustrate the use of cap nuts as wire guides, it is understood that the wire guides 122 and/or 126 may alternatively comprise ball bearings, roller bearings, or other guiding means.

Figure 25:
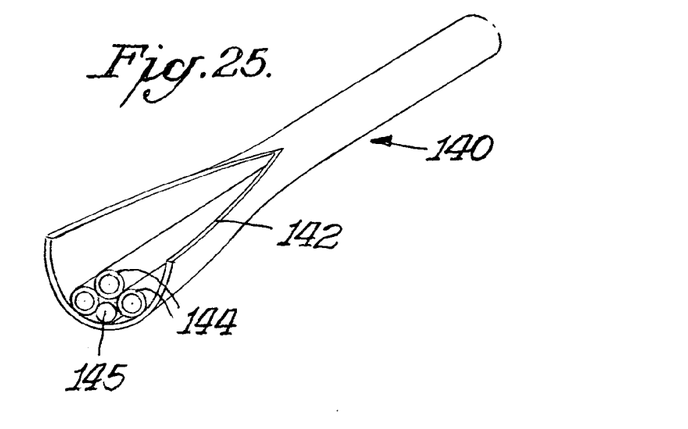
FIG. 25 is a perspective view of wire cut open using the wire stripper shown in FIG. 22.

Using wire guides 122 and/or 126 and blades 118, wire sheath 142 may be removed from wire core 144, as shown in FIG. 25. Wire sheath 142 may be ultimately detached from the wire core 144 by tugging, pulling, cutting or ripping the stripped portion of wire sheath 142 away from wire core 144 and the remainder of covered wire 140.

The foregoing description of the invention illustrates and describes the present invention. Additionally, the disclosure shows and describes only exemplary embodiments of the invention, but it is to be understood that the invention, including all embodiments, are capable of use in various combinations, modifications, and environments and are capable of changes or modifications within the scope of the inventive concept as expressed herein, commensurate with the above teachings, and/or the skill or knowledge in the art of cutting and, more particularly wire stripping. Accordingly, the description is not intended to limit the invention to the form disclosed herein. Also, it is intended that the appended claims be construed to include alternative embodiments.

What is claimed is:

1. A device for cutting a wire sheath, comprising:
    a main body having a spine and at least two side portions spaced apart from the spine defining open spaces therebetween, wherein said side portions are spaced apart a first distance from one another in a first position and when pressure is applied at least a portion of each side portion flexes from the first position to a second position in which said portions of each side portion are spaced apart a second distance that is shorter than the first distance, said main body defining a U-shaped opening with a first portion and a second portion,
    said first portion of said U-shaped opening for engaging the sheath along a first predetermined length of the device, said first portion defining a first longitudinal axis, and
    said second portion of said U-shaped opening for engaging the sheath along a second predetermined length of the tool, said second portion defining a second longitudinal axis that is angularly offset from and intersects the first longitudinal axis;
    a first blade directed inwardly within the U-shaped opening and positioned within the first portion, said first blade being aligned to cut the sheath in a longitudinal direction; and
    a second blade directed inwardly within the U-shaped opening and positioned within the second portion, said second blade being aligned to cut the sheath in a transverse direction.

2. The device of claim 1, further comprising an insulation layer overlying the main body.

3. The device of claim 2, wherein the insulation layer is provided with at least one indentation.

4. The device of claim 1, wherein the second portion is angularly offset from the first portion at an angle in the range of 1 to 179 degrees.

5. The device of claim 1, wherein the first blade has a blade configuration selected from the group consisting of straight, curved and triangular, and the second blade has a blade configuration selected from the group consisting of straight, curved and triangular.

6. The device of claim 1, further comprising:
    a first pair of wire guides located at opposing distal ends of the inwardly facing sides of a U-shaped opening of the first portion for maintaining engagement with the sheath during longitudinal cutting, said wire guides projecting inwardly from opposite surfaces of the first portion.

7. The device of claim 6, further comprising:
    a second pair of wire guides located at opposing distal ends of the inwardly facing sides of the U-shaped opening of the second portion for maintaining engagement with the sheath during transverse cutting, said wire guides projecting inwardly from opposite surfaces of the second portion.

8. The device of claim 7, further comprising a first blade guide projecting inwardly from a midpoint surface of the U-shaped opening within the first portion.

9. The device of claim 8, further comprising a second blade guide projecting inwardly from a midpoint surface of the U-shaped opening within the second portion.

10. The device of claim 8 wherein the first and second wire guide pairs are cap nuts or ball bearings, and the first and second blade guides are cap nuts or ball bearings.

11. A device for cutting a wire sheath, comprising:
    a main body defining an exterior and an interior, with one continuous interior U-shaped opening having a first portion and a second portion, said main body having a spine and at least two side portions spaced apart from the spine defining open spaces therebetween, wherein said portions are spaced apart a first distance from one another in a first position and when pressure is applied at least a portion of each side portion flexes from the first position to a second position in which said portions of each side portion are spaced apart a second distance that is shorter than the first distance, said first portion of said U-shaped opening for engaging the sheath along a first predetermined length of the device, said first portion defining a first longitudinal axis, and said second portion of said U-shaped opening for engaging the sheath along a second predetermined length of the tool, said second portion defining a second longitudinal axis that is angularly offset from and intersects the first longitudinal axis and with said second portion communicating with said first portion;

a first blade directed inwardly within the U-shaped opening and positioned within the first portion, said first blade being aligned to cut the sheath in a longitudinal direction;

a second blade directed inwardly within the U-shaped opening and positioned within the second portion, said second blade being aligned to cut the sheath in a transverse direction; and one or more grips on the exterior of the main body.

* * * * *